United States Patent [19]

Whelan

[11] 4,294,701

[45] Oct. 13, 1981

[54] PAINT STRAINER

[75] Inventor: James P. Whelan, North Marshfield, Mass.

[73] Assignee: Ad-Tec Products, Inc., Plymouth, Mass.

[21] Appl. No.: 761,895

[22] Filed: Jan. 24, 1977

[51] Int. Cl.[3] .................... B01D 23/28

[52] U.S. Cl. .................... 210/497.2

[58] Field of Search .................... 210/469, 474, 497 R, 210/497 FB; D7/47, 129; D23/4

[56] References Cited

U.S. PATENT DOCUMENTS

| | | | |
|---|---|---|---|
| 257,516 | 5/1882 | Rice | 210/497 X |
| 752,019 | 2/1904 | Adwen | 210/497 FB X |
| 1,293,297 | 2/1919 | Anderson | 210/474 |
| 1,505,898 | 8/1924 | Kirby | 210/474 X |
| 3,567,033 | 3/1971 | Whelan | 210/497 FB |
| 3,738,889 | 6/1973 | Whelan | 210/497 FB X |
| 3,741,397 | 6/1973 | Gerson et al. | 210/497 FB |
| 3,861,975 | 1/1975 | Hauslein | 210/474 X |

*Primary Examiner*—Robert H. Spitzer

*Attorney, Agent, or Firm*—Robert T. Gammons

[57] ABSTRACT

A paint strainer in the form of a frustoconical structure, to the lower smaller diameter open end of which is applied a screening material with a portion crossing the open end lying in a plane perpendicular to the axis of the structure and a portion folded over the edge of the opening onto the arcuate surface of the structure and bonded thereto.

3 Claims, 12 Drawing Figures

PAINT STRAINER

BACKGROUND OF THE INVENTION

Disposable paint strainers are widely used in the automobile industry to strain paint prior to spray-painting of automobile bodies to minimize clogging of the spray guns, examples of which are shown in U.S. Pat. Nos. 3,567,033; 3,738,889; and 3,741,397. One of the major problems encountered in making such paint strainers is to make a joint where the ends of the strainer blanks are brought together to form the desired conical configuration which will be sufficiently strong to withstand the weight of the paint when the strainer is filled and will be resistant to the solvent action of the paint. While most paints now used are solvent-based, there is an increasing use of water-based paints and, so far as is known, there is no known adhesive which is both water-resistant and solvent-resistant. Thus, it is necessary to make two kinds of strainers, one for solvent-based paint and one for water-based paint. The paint strainer of this invention is designed for use with both solvent-based and water-based paints and, in addition, has the further advantages over prior strainers of eliminating the problem inherent in making a closed point at the bottom of a conical structure; slow straining speed as the level of the paint within the container subsides; loss of paint at the bottom of the strainer; economy in the use of material for its manufacture; and reduction in exterior dimensions without loss of capacity with a saving in shipping costs.

SUMMARY

As herein illustrated, the disposable paint strainer comprises an open end receptacle of relatively stiff imperforate paperboard and a screening material applied across one open end so that the portion crossing the open end is substantially flat and perpendicular to the axis of the receptacle and the remainder is folded over the edge bounded by the opening onto the outer curved surface and secured thereto by a solvent-resistant adhesive. The receptacle is preferably frustoconical in shape, having open ends, one of which is smaller than the other and the screening material is applied to the smaller end so that the portion crossing the open smaller end is taut and lies in a flat plane substantially perpendicular to the axis of the cone. The screening material may be a square piece of material applied substantially symmetrically with respect to the axis of the cone or may be a circular piece of material. When applied in the form of a square piece, the square piece is so applied that one of the corners of the square coincides substantially with the seam joining the ends of the blank comprising the cone.

The invention will now be described in greater detail with reference to the accompanying drawings, wherein.

Figure 2:
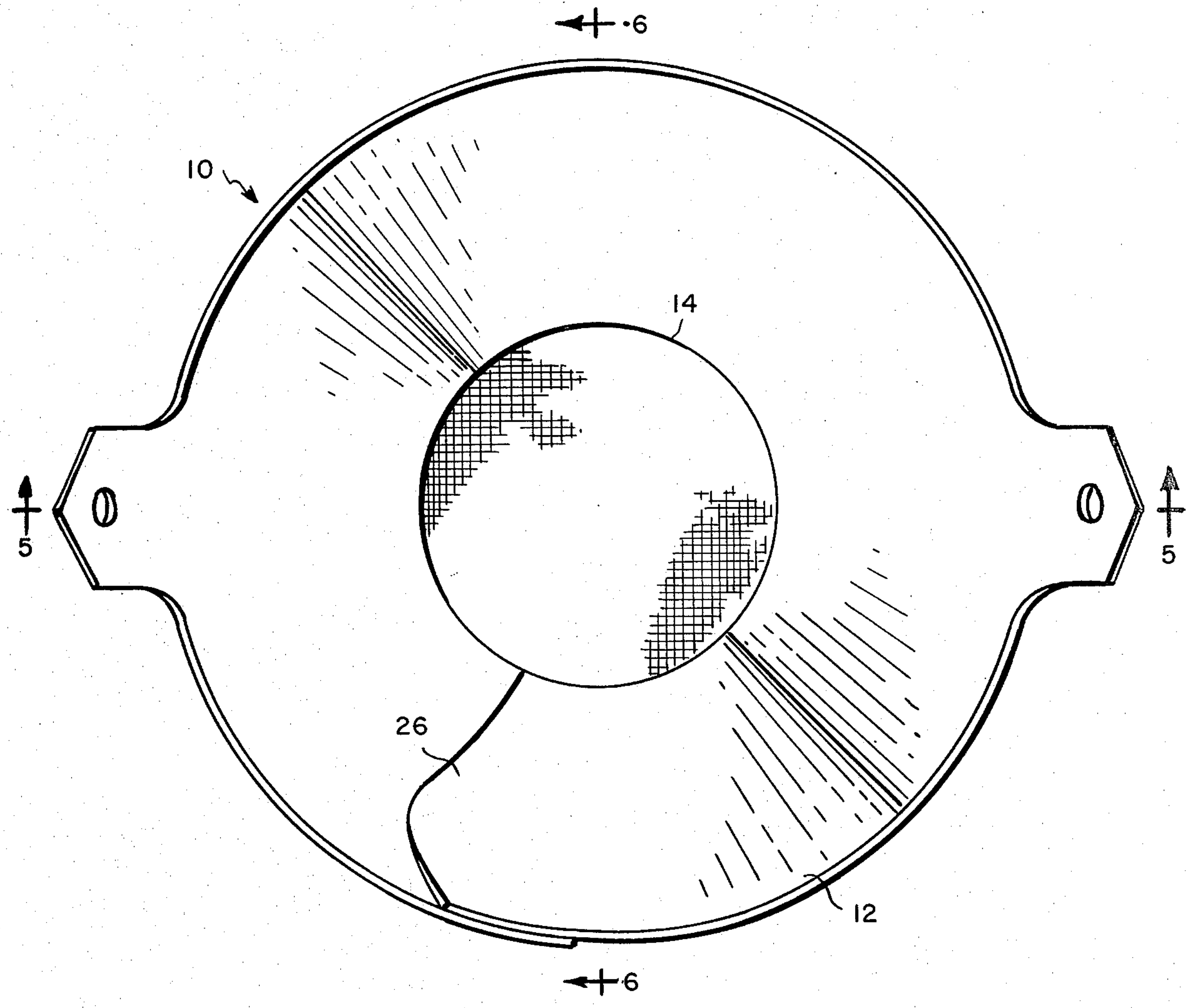
FIG. 2 is a plan view of FIG. 1.

Referring to the drawings, the paint strainer of this invention comprises a frustoconical receptacle 10 having an imperforate side wall 12 and a perforate bottom wall 14. The structure is made from a blank 16 having arcuate upper and lower edges 18 and 20 and ends 22 and 24, the end 22 being provided with a seam-forming element 26. The blank 16 is cut from a relatively stiff paperboard, although other materials may be used for this purpose, whereupon it is rolled to form a cone so that the seam-forming element 26 overlaps the end 24. An adhesive 28 is applied to the seam-forming element 26 so that when it is brought into overlapping engagement with the end 24, it will become bonded thereto. The seam-forming element 26 is of somewhat bulbular shape as shown in my U.S. Pat. No. 3,738,889 to provide a relatively wide seam which will withstand considerable solvent action of the paint without failing.

Figure 1:
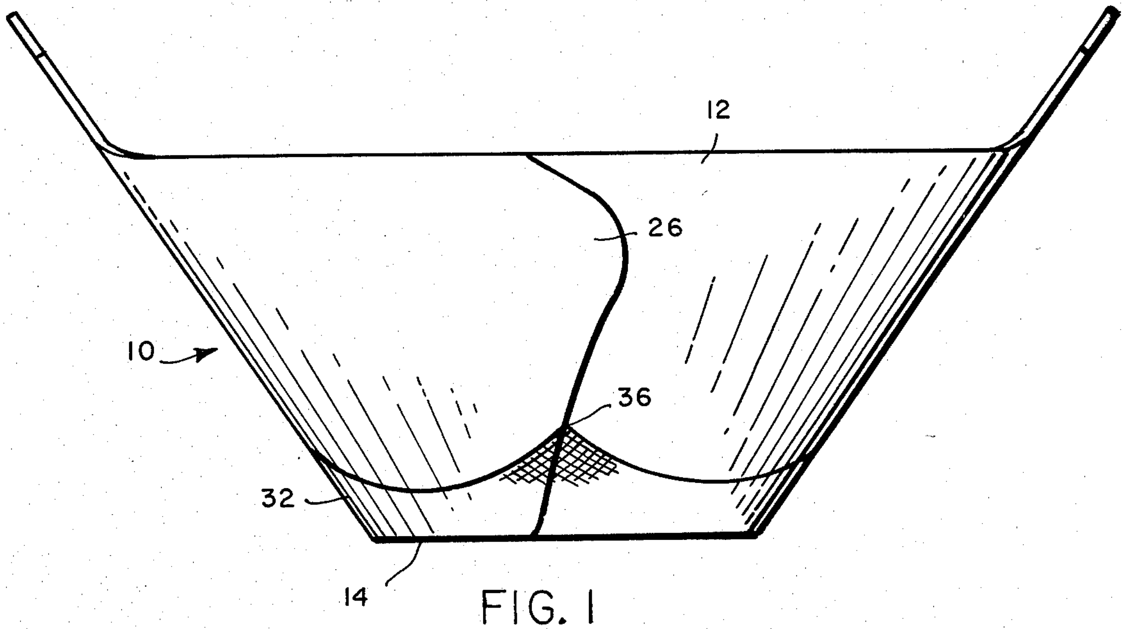
FIG. 1 is a front elevation of the dispenser.
Figure 3:
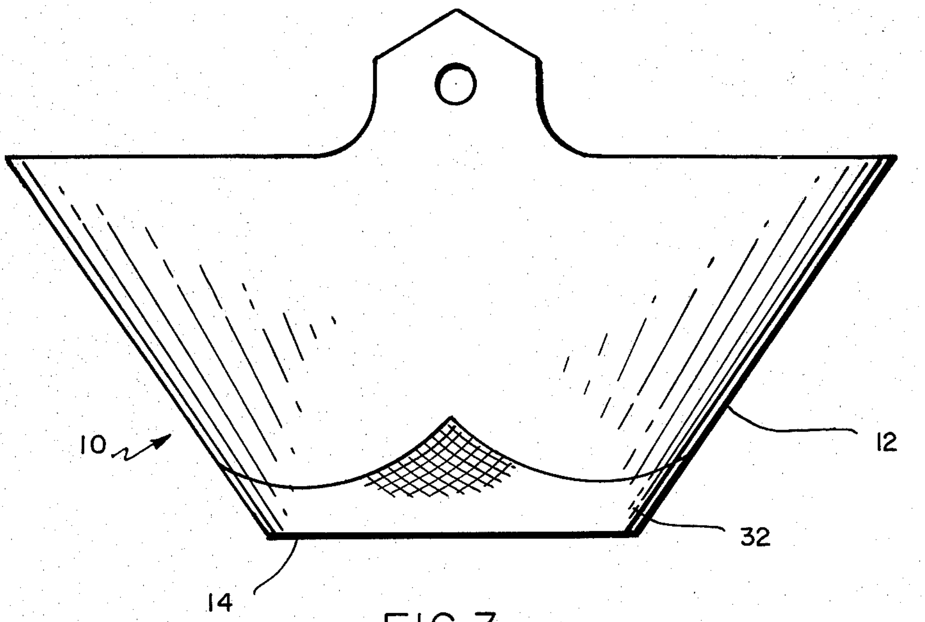
FIG. 3 is an elevation as viewed from the right side of FIG. 1.
Figure 4:
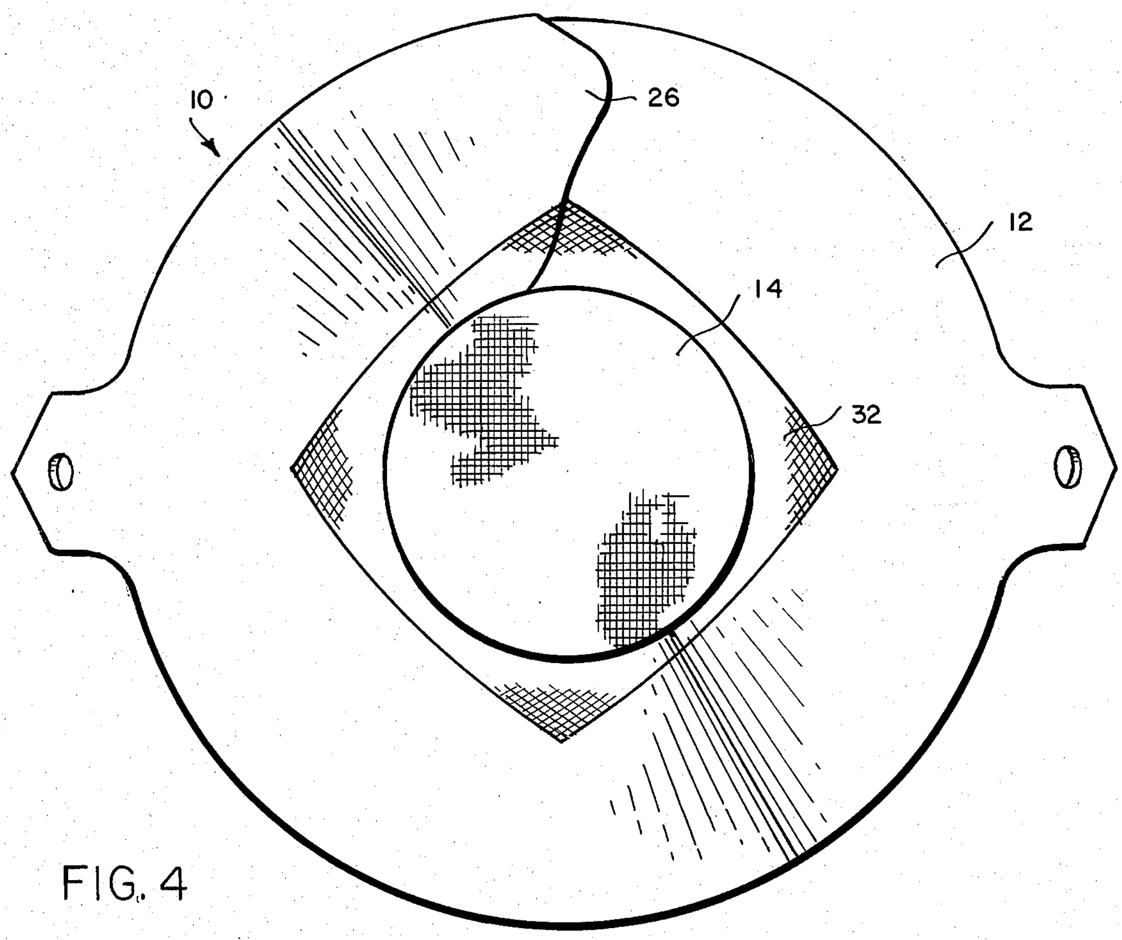
FIG. 4 is a view as seen from the bottom of FIG. 1.
Figure 5:
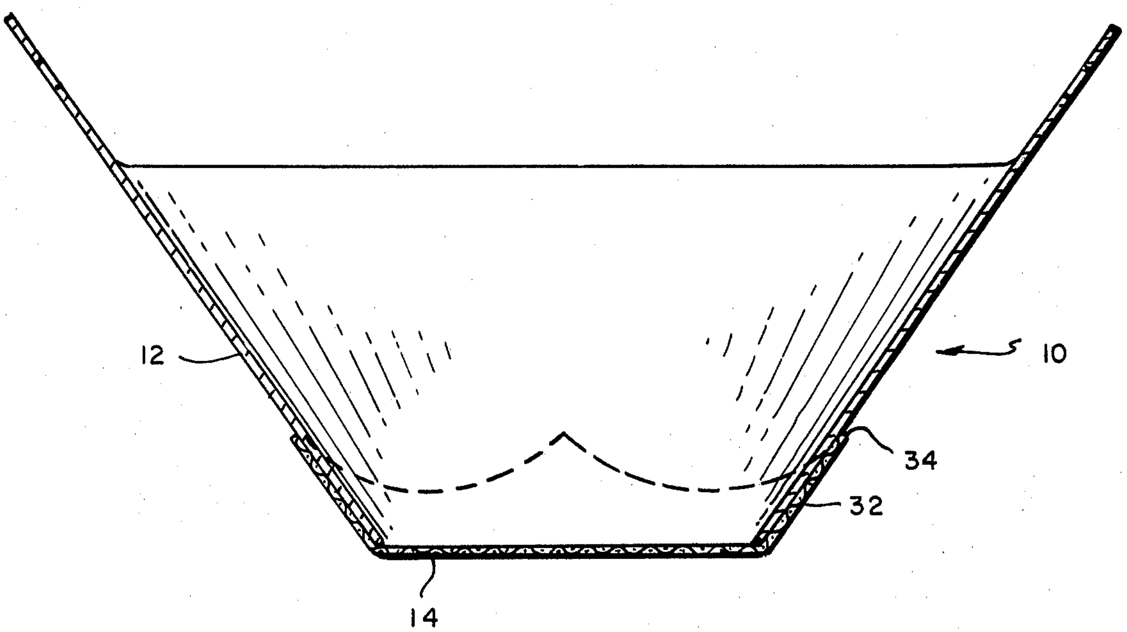
FIG. 5 is a section diametrically of FIG. 2 taken on the line 5—5 of FIG. 2.
Figure 6:
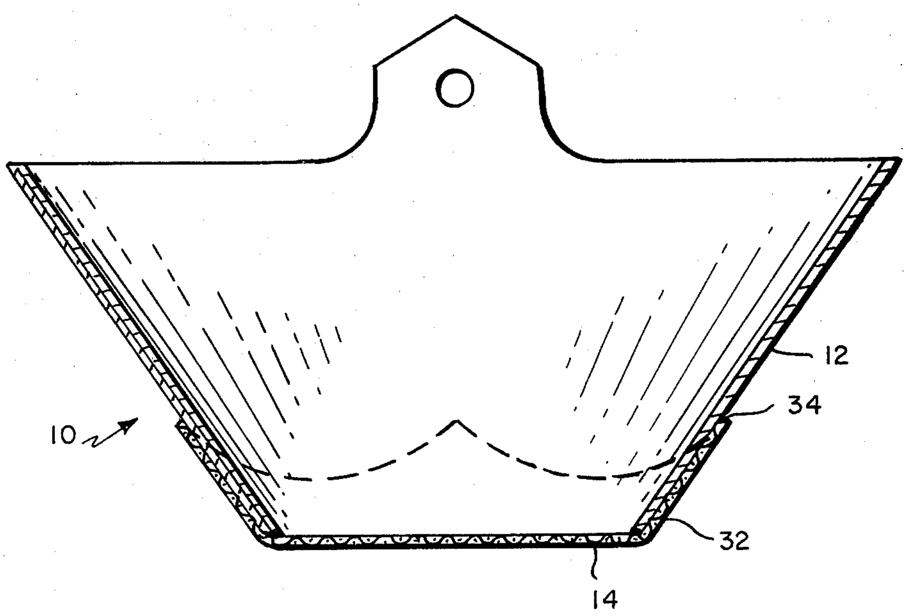
FIG. 6 is a section diametrically of the strainer taken at right angles to that shown in FIG. 5.
Figure 10:
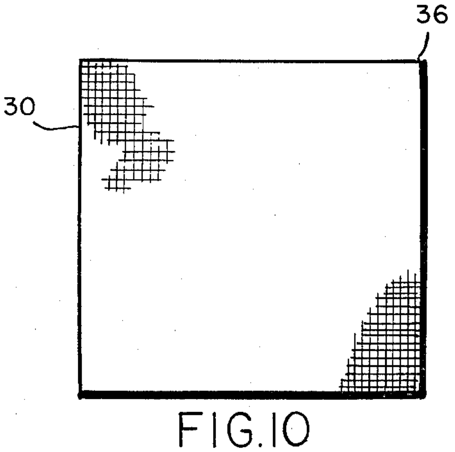
FIG. 10 is a plan view of the screening member used for the bottom of the strainer shown in FIGS. 1 to 6.

After forming the blank 16 into a cone and effecting a seal at the ends, the cone is placed on a correspondingly shaped mandrel and a screening material 30, FIG. 10, is applied across the open smaller lower end of the cone. The screening material 30 is a woven mesh and is stretched taut across the open end to form the bottom 14 and folded over the edge bounding the open end onto the outer surface of the cone. The folded-over portion 32 of the screening material is adhesively secured to the outer surface all the way around by means of a solvent-resistant adhesive 34. As illustrated in FIG. 10, the screening material is a square of woven material and, as illustrated in FIGS. 1 and 4, it is applied to the open end so that the corners 36 are symmetrical with respect to the axis of the cone and preferably so positioned that one of the corners coincides with the edge of the attaching element 26.

Figure 7:
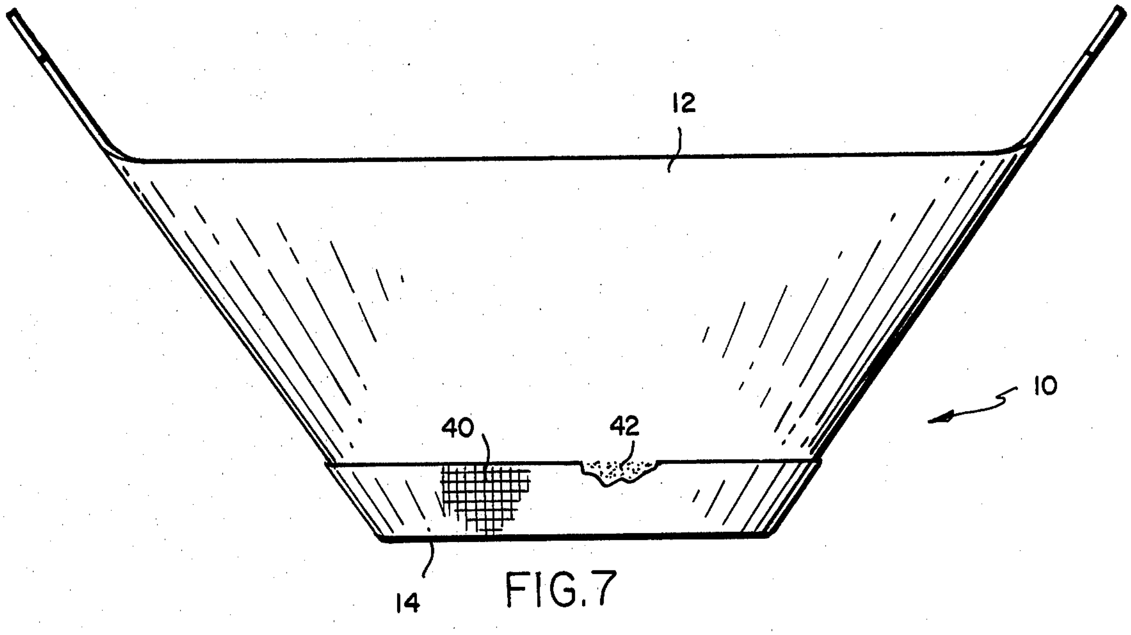
FIG. 7 is a front elevation of an alternative construction.
Figure 8:
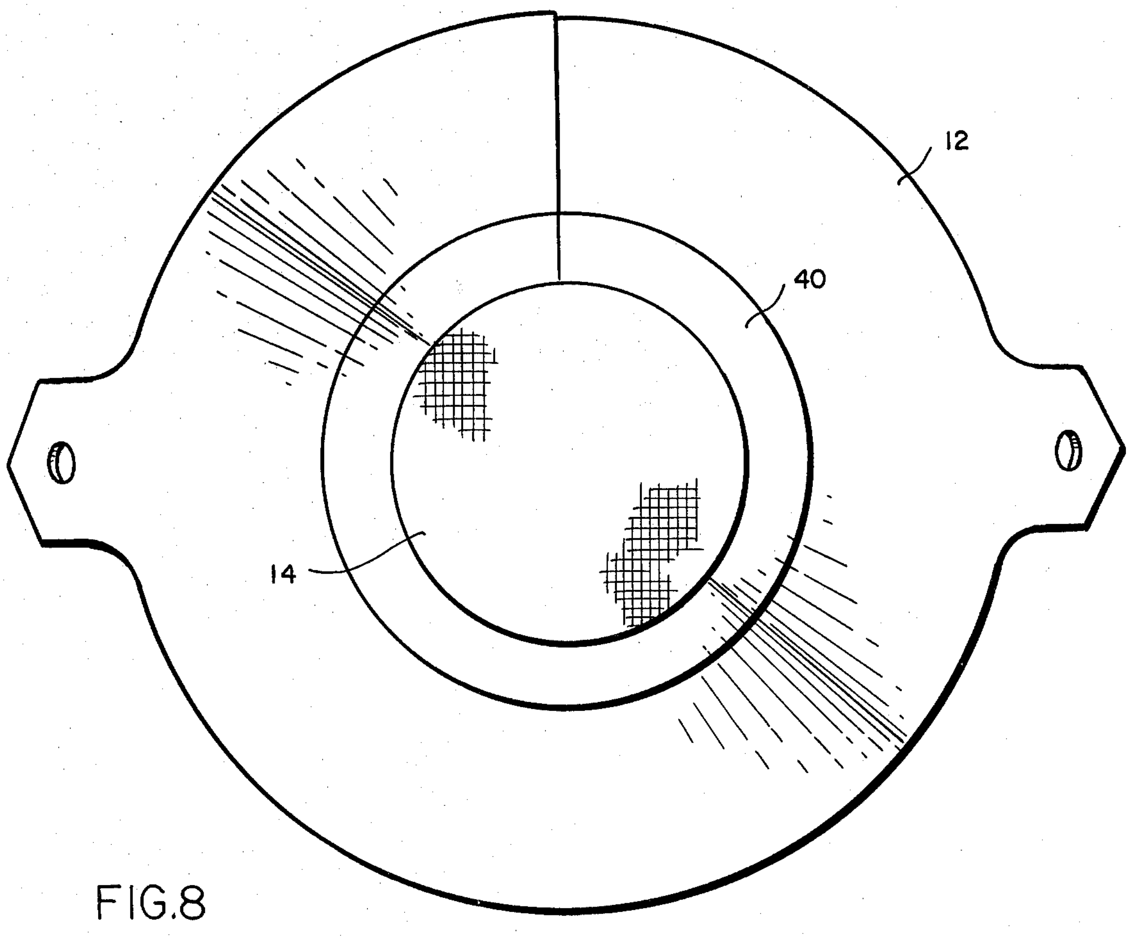
FIG. 8 is a bottom view of the alternative construction wherein the screening material is of circular configuration rather than square.
Figure 9:
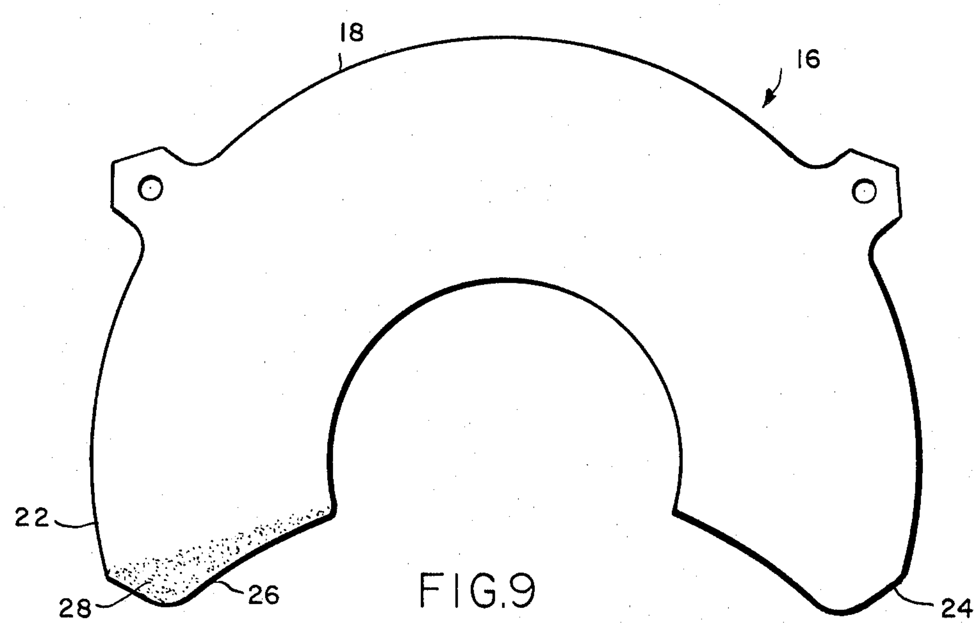
FIG. 9 is a plan view of the blank of which the receptacle shown in FIGS. 1 to 6 is formed.
Figure 11:
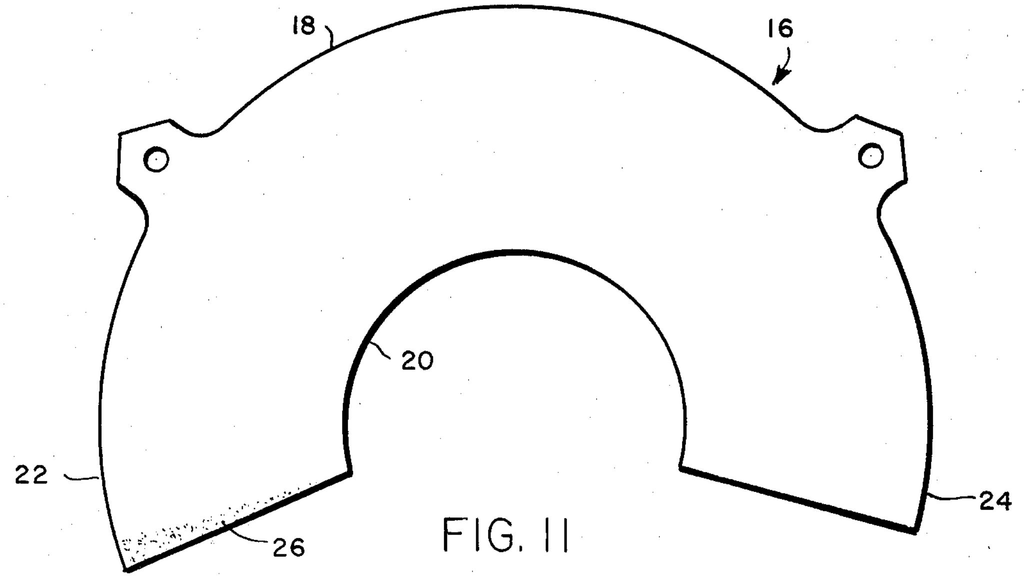
FIG. 11 is a plan view of the blank for the alternative structure.
Figure 12:
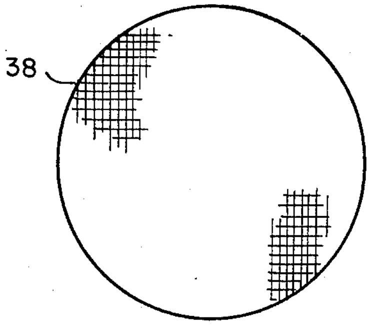
FIG. 12 is a plan view of the screening member used for the bottom of the alternative structure shown in FIGS. 7 and 8.

Alternatively, a circular piece 38, FIG. 12, of screening material may be applied tautly across the bottom as shown in FIGS. 7 and 8 with its center coinciding with the axis and folded over onto the outer surface. The folded-over portion 40 is adhesively secured to the outer surface with a solvent-resistant adhesive 42. The structure shown in FIGS. 7 and 8 is made from a blank such as shown in FIG. 11 wherein the seam-forming element 26 is of tapering configuration rather than bulbous as shown in FIGS. 1 to 4, however, it could be bulbous as also could the seam-forming element shown in FIGS. 1 to 4 be of tapering configuration. Moreover, a square or round patch of screening material could be applied to either of the structures.

In accordance with the invention, the screening material is applied to the outer surface of the side wall of the strainer rather than to the inner surface as is customary in making strainers heretofore and an adhesive is applied to attach the folded-over marginal portion 32–40 of the screening material to the outer surface that is selected to be insoluble in the solvents that are used for making solvent-based paints. Hence, the strainer can be safely used for filtering solvent-based paints because the adhesive securing the screening material is on the outer surface and, hence, not exposed to the solvent within the container. The strainer can be equally used for water-based paints, for although the adhesive used is susceptible of dissolving in the presence of water, the paperboard of which the strainer is made is sufficiently impervious to water that the water in this water-based paint does soak through and, hence, reach the adhesive layer on the outer surface and so does not weaken the bond.

The overlap of the screening material onto the outer side of the cone itself reinforces the seam and, as related above, when using a square piece of screening material, by placing the square piece of screening material symmetrically so that one corner coincides with the seam, the latter may be further reinforced.

The structure as thus designed has the important advantages that it can be used for filtering either solvent or water-based paints; that, because of its truncated shape and flat perforate bottom, it can be completely drained; and that there is no residue of paint left at the bottom as there is in a conical strainer, thus saving paint. Further advantages are that the rate of straining will be substantially constant from top to bottom in contrast to those strainers wherein there are side openings which reduce the head and, hence, the rate of flow as the level recedes; that the problems normally encountered in making a closed conical end have been eliminated; that a saving both in the paperboard material of the cone and the screening material can be realized and that the final structure can be packaged in much smaller space so as to effect an economy in shipping costs.

While the strainer is described as being comprised of a stiff paperboard, it is understood that it can be made of other materials, that it is not necessarily of right circular section, but may be of right polygonal section, and that the screening material may be comprised of a woven material or of any material suitably perforated to provide for the rate of drainage and separation of solid matter required.

It should be understood that the present disclosure is for the purpose of illustration only and includes all modifications or improvements which fall within the scope of the appended claims.

I claim:

1. A paint strainer comprising a hollow truncated conical structure having an imperforate side wall of stiff paperboard and open ends, one of which is smaller than the other, a web of flexible screening material stretched taut across the smaller end constituting a perforate bottom for the structure, said screening material being folded upwardly from the bottom onto the outer surface of the side wall and a layer of solvent-resistant adhesive securing the entire surface area of the upwardly-folded portion of the web of flexible screening material to the entire outer surface area of the side wall covered by said upwardly-folded portion of the web of flexible screening material.

2. A strainer according to claim 1 wherein said web of screening material is square and is applied with its corners substantially symmetrically located with respect to the axis of the structure.

3. A strainer according to claim 1 wherein the web of screening material is circular.

* * * * *